(12) United States Patent
Taniguchi et al.

(10) Patent No.: US 11,692,091 B2
(45) Date of Patent: Jul. 4, 2023

(54) RESIN COMPOSITION FOR INJECTION MOLDING

(71) Applicants: SEKISUI CHEMICAL CO., LTD., Osaka (JP); TOKUYAMA SEKISUI CO., LTD., Osaka (JP)

(72) Inventors: Hiroshi Taniguchi, Yamaguchi (JP); Norikazu Mashino, Yamaguchi (JP); Tsukasa Gotou, Yamaguchi (JP); Hiroaki Mochizuki, Yamaguchi (JP)

(73) Assignees: SEKISUI CHEMICAL CO., LTD., Osaka (JP); TOKUYAMA SEKISUI CO., LTD., Osaka (JP)

( * ) Notice: Subject to any disclaimer, the term of this patent is extended or adjusted under 35 U.S.C. 154(b) by 74 days.

(21) Appl. No.: 16/637,000

(22) PCT Filed: Sep. 26, 2018

(86) PCT No.: PCT/JP2018/035721
§ 371 (c)(1),
(2) Date: Feb. 6, 2020

(87) PCT Pub. No.: WO2019/065748
PCT Pub. Date: Apr. 4, 2019

(65) Prior Publication Data
US 2020/0199342 A1    Jun. 25, 2020

(30) Foreign Application Priority Data

Sep. 27, 2017   (JP) .................................. 2017-187164

(51) Int. Cl.
| | | |
|---|---|---|
| C08L 27/24 | (2006.01) | |
| B29C 45/00 | (2006.01) | |
| B29K 27/06 | (2006.01) | |
| B29K 105/00 | (2006.01) | |

(52) U.S. Cl.
CPC .......... *C08L 27/24* (2013.01); *B29C 45/0001* (2013.01); *B29K 2027/06* (2013.01); *B29K 2105/0044* (2013.01); *C08L 2201/08* (2013.01); *C08L 2205/025* (2013.01)

(58) Field of Classification Search
CPC ................ C08L 27/24; C08L 2201/08; C08L 2205/025; C08L 27/06; C08L 2205/02; C08L 2205/035; C08L 2203/18; C08L 51/04; C08L 91/08; C08L 33/12; C08L 55/02; C08L 25/10; C08L 53/02; C08L 9/06; C08L 2205/03; C08L 2205/05; C08L 2205/06; C08L 33/04; B29C 45/0001; B28K 2105/0044; B29K 2027/06; B29K 2105/0044; C08K 5/098; C08K 5/005; C08K 2201/014; C08K 2201/019; C08K 3/014; C08K 3/22; C08K 5/1345; C08K 3/10; C08K 5/13; C08F 8/22; C08F 8/20; C08F 114/06; C08F 14/06; C08F 8/24; F16L 9/127; F16L 9/12; F16L 11/12
USPC ......................................................... 524/291
See application file for complete search history.

(56) References Cited

U.S. PATENT DOCUMENTS

| | | | |
|---|---|---|---|
| 5,143,959 | A | 9/1992 | Carette et al. |
| 10,000,634 | B2 * | 6/2018 | Matsumura ............ C08K 5/098 |
| 2009/0030123 | A1 | 1/2009 | Zhou |
| 2014/0066559 | A1 | 3/2014 | Tairabune et al. |
| 2014/0336321 | A1 | 11/2014 | Yamasugi et al. |
| 2016/0200893 | A1 | 7/2016 | Matsumura et al. |
| 2016/0208072 | A1 | 7/2016 | Matsumura et al. |
| 2017/0183491 | A1 | 6/2017 | Matsumura et al. |

FOREIGN PATENT DOCUMENTS

| | | |
|---|---|---|
| CN | 103102631 | 5/2013 |
| CN | 103476857 | 12/2013 |
| CN | 103665684 | 3/2014 |
| CN | 104011131 | 8/2014 |
| CN | 105968642 | 9/2016 |
| CN | 106147092 | 11/2016 |
| CN | 106232713 | 12/2016 |
| CN | 106432994 | 2/2017 |
| CN | 107177147 | 9/2017 |
| EP | 3 173 444 | 5/2017 |
| JP | 6-287388 | 10/1994 |
| JP | 8-127688 | 5/1996 |
| JP | 10-296821 | 11/1998 |
| JP | 11-12420 | 1/1999 |
| JP | 2000-86732 | 3/2000 |
| JP | 2002-138179 | 5/2002 |
| JP | 2002-226659 | 8/2002 |
| JP | 2002-254576 | 9/2002 |
| JP | 2002-273790 | 9/2002 |

(Continued)

OTHER PUBLICATIONS

Clark et al., "Mechanical Criteria for Polymer Compatibility: Poly(vinylchloride)/Post-chlorinated Poly(vinyl-chloride) Blends," Polym. Eng. Sci, 22(11), 698-704. (Year: 1982).*

(Continued)

*Primary Examiner* — Frances Tischler
(74) *Attorney, Agent, or Firm* — Wenderoth, Lind & Ponack, L.L.P.

(57) ABSTRACT

The present invention provides a resin composition for injection molding that can provide a molded body having excellent thermal stability, excellent thermal fluidity, and high water pressure resistance without a heavy metal such as lead or tin. The present invention also provides a molded body including the resin composition for injection molding. Provided is a resin composition for injection molding containing: a chlorinated polyvinyl chloride; polyvinyl chloride; and a thermal stabilizer, the thermal stabilizer containing a calcium alkyl carboxylate and a zinc compound, the polyvinyl chloride having a degree of polymerization of 400 to 1,000, the resin composition containing the polyvinyl chloride in an amount of 1 to 30 parts by mass relative to 100 parts by mass of the chlorinated polyvinyl chloride.

9 Claims, No Drawings

(56) References Cited

FOREIGN PATENT DOCUMENTS

| | | |
|---|---|---|
| JP | 2003-97768 | 4/2003 |
| JP | 2003-292712 | 10/2003 |
| JP | 2004-99697 | 4/2004 |
| JP | 2004-231718 | 8/2004 |
| JP | 2005-28756 | 2/2005 |
| JP | 2006-328166 | 12/2006 |
| JP | 2008-214466 | 9/2008 |
| JP | 2008-535997 | 9/2008 |
| JP | 2010-265365 | 11/2010 |
| JP | 2014-224176 | 12/2014 |
| WO | 2006/110112 | 10/2006 |
| WO | 2008/018521 | 2/2008 |
| WO | 2012/160943 | 11/2012 |
| WO | 2013/080563 | 6/2013 |
| WO | 2015/046454 | 4/2015 |
| WO | 2016/013638 | 1/2016 |
| WO | 2015/046456 | 3/2017 |

OTHER PUBLICATIONS

International Search Report dated Nov. 27, 2018 in International (PCT) Application No. PCT/JP2018/035721.

Zhong, Zhikai et al., "Blends of poly(vinyl chloride) with acrylonitrilechlorinated polyethylene-styrene copolymer. I. Miscibility, phase behavior, and thermal properties", Journal of Macromolecular Science, Part B: Physics, 1997, vol. 36, No. 4, pp. 441-454.

Extended European Search Report dated May 17, 2021 in corresponding European Patent Application No. 18862125.4.

Marossy et al., "Anomalous behaviour of PVC-CPVC-CPE blends", Plastics, Rubber and Composites, 2005, vol. 34, No. 10, pp. 438-442.

Extended European Search Report dated Feb. 1, 2018 in European Application No. 15824766.8.

* cited by examiner

US 11,692,091 B2

RESIN COMPOSITION FOR INJECTION MOLDING

TECHNICAL FIELD

The present invention relates to a resin composition for injection molding that can provide a molded body having excellent thermal stability, excellent thermal fluidity, and high water pressure resistance without a heavy metal such as lead or tin. The present invention also relates to a molded body including the resin composition for injection molding.

BACKGROUND ART

Polyvinyl chloride compositions are widely used as materials for resin molded bodies such as, for example, building materials. Polyvinyl chloride compositions are required to have high thermal stability as they in some cases are processed at high temperature. They need high thermal stability also to provide molded bodies with thermal stability. Polyvinyl chloride compositions also need to have coloration resistance because color is important for resin molded bodies used as building materials.

To meet these demands, polyvinyl chlorides are typically mixed with thermal stabilizers before melt molding so as to improve various properties including thermal stability and coloration resistance.

Conventionally used thermal stabilizers contain heavy metals such as lead, cadmium, or barium. As the toxicity and the adverse effects of heavy metals on the environment have become problems, thermal stabilizers and resin molded products free from highly toxic metals such as lead have been proposed.

For example, Patent Literature 1 discloses a halogen-containing resin composition that contains a halogen-containing resin and a composite of acid clay and/or activated clay and a calcium hydroxide compound represented by $Ca_{1-x-y}M^{2+}{}_xAl_y(OH)_2$ (where $M^{2+}$ is a divalent metal such as Mg, Zn, or Cu and x and y meet $0 \leq x < 0.4$ and $0 \leq y < 0.1$, respectively).

The recent increase in interest in environmental protection and conservation has increased the demand for thermal stabilizers and resin molded bodies free from even a heavy metal having lower toxicity than lead, such as tin. In such a situation, Patent Literature 2, for example, discloses a stabilizer composition containing a nitrogen-containing cyclic organic compound.

Even with such a stabilizer composition, however, molded products tend to be colored. To prevent coloration, addition of a large amount of expensive pigment or titanium oxide is required.

There is a demand for further improvement in the properties of resin compositions for injection molding and molded bodies containing such heavy metal-free thermal stabilizers.

Chlorinated polyvinyl chlorides, obtained by chlorinating polyvinyl chlorides, are known.

Chlorinated polyvinyl chlorides are expected to have improved heat resistance while maintaining the characteristics of polyvinyl chlorides such as incombustibility and chemical resistance. However, chlorinated polyvinyl chlorides are less likely to exhibit enough impact resistance and surface appearance in injection molded product applications such as joints and valve products.

A method thus has been disclosed in which a methyl methacrylate-butadiene-styrene copolymer, an acrylonitrile-butadiene-styrene copolymer, or the like is added as an impact resistance reinforcement to a chlorinated polyvinyl chloride.

Adding such a reinforcement to a chlorinated polyvinyl chloride, however, reduces the fluidity in injection molding, causing trouble in terms of production conditions.

Some methods use a plasticizer or the like to improve the fluidity. Such methods unfortunately reduce the water pressure resistance of the resulting molded bodies.

CITATION LIST

Patent Literature

Patent Literature 1: JP 2008-214466 A
Patent Literature 2: JP 2008-535997 T

SUMMARY OF INVENTION

Technical Problem

The present invention aims to provide a resin composition for injection molding that can provide a molded body having excellent thermal stability, excellent thermal fluidity, and high water pressure resistance without a heavy metal such as lead or tin. The present invention also aims to provide a molded body including the resin composition for injection molding.

Solution to Problem

The present invention relates to a resin composition for injection molding containing: a chlorinated polyvinyl chloride; polyvinyl chloride; and a thermal stabilizer, the thermal stabilizer containing a calcium alkyl carboxylate and a zinc compound, the polyvinyl chloride having a degree of polymerization of 400 to 1,000, the resin composition containing the polyvinyl chloride in an amount of 1 to 30 parts by mass relative to 100 parts by mass of the chlorinated polyvinyl chloride.

The present invention is described in detail below.

WO 2016/013638 discloses a method that uses the thermal stabilizer free from a heavy metal such as lead or tin mentioned above. Specifically, the method uses a calcium alkyl carboxylate and a zinc compound.

However, the use of such a thermal stabilizer still results in low thermal stability. Especially for use in injection molding, higher thermal stability is required.

The inventors made intensive studies to find out that adding, in addition to a chlorinated polyvinyl chloride, a predetermined amount of a polyvinyl chloride having a degree of polymerization in a specific range to a resin composition for injection molding makes it possible to produce a molded body having excellent thermal stability, excellent thermal fluidity, and high water pressure resistance without a heavy metal such as lead or tin. The inventors thus completed the present invention.

The resin composition for injection molding of the present invention contains a chlorinated polyvinyl chloride (hereinafter also referred to as a "CPVC").

The chlorinated polyvinyl chloride is a polyvinyl chloride chlorinated to have a higher chlorine content. The chlorinated polyvinyl chloride refers to a polyvinyl chloride having a chlorine content of 56.8% by mass or higher.

Preferably, the CPVC has structural units (a) to (c) represented by the following formulae (a) to (c), and the proportion of the structural unit (a) is 17.5 mol % or less, the proportion of the structural unit (b) is 46.0 mol % or more, and the proportion of the structural unit (c) is 37.0 mol % or less, relative to the total number of moles of the structural units (a), (b), and (c). Such a CPVC has high thermal stability and satisfactory molding processability.

[Chem. 1]

The molar ratios of the structural units (a), (b), and (c) in the CPVC reflect the site to which chlorine is introduced at the time of chlorination of the polyvinyl chloride (PVC). Ideally, the PVC prior to chlorination is substantially in a state where the proportion of the structural unit (a) is 0 mol %, the proportion of the structural unit (b) is 50.0 mol %, and the proportion of the structural unit (C) is 50.0 mol %. As chlorination proceeds, however, the proportion of the structural unit (c) decreases, while the proportions of the structural unit (b) and the structural unit (a) increase. At this time, nonuniformity of the chlorinated state will increase in a case where the proportion of the structural unit (a), which is unstable with a large steric hindrance, excessively increases, or in a case where the chlorinated site and the unchlorinated site are unevenly present within the same particle of the CPVC. When this nonuniformity increases, the thermal stability of the CPVC will be greatly impaired.

On the other hand, in the present invention, the molar ratios of the structural units (a), (b), and (c) in the CPVC are set within the above range, so that the CPVC has improved uniformity and satisfactory thermal stability.

In the present invention, the proportion of the structural unit (a) relative to the total number of moles of structural units (a), (b), and (c) is 17.5 mol % or less, preferably 16.0 mol % or less, and preferably 2.0 mol % or more.

The proportion of the structural unit (b) relative to the total number of moles of structural units (a), (b), and (c) is 46.0 mol % or more, preferably 53.5 mol % or more, and preferably 70 mol % or less.

The proportion of the structural unit (c) relative to the total number of moles of structural units (a), (b), and (c) is 37.0 mol % or less, preferably 30.5 mol % or less, and preferably 1.0 mol % or more.

In the present invention, it is particularly preferred that the proportion of the structural unit (b) be 58.0 mol % or more, and the proportion of the structural unit (c) be 35.8 mol % or less. With this structure, higher thermal stability can be achieved.

The molar ratios of the structural units (a), (b), and (c) in the CPVC can be measured by molecular structure analysis using NMR. NMR analysis can be performed in accordance with the method described in R. A. Komoroski, R. G. Parker, J. P. Shocker, Macromolecules, 1985, 18, 1257-1265.

A PVC portion not chlorinated in the molecular structure of the CPVC can be represented by a structural unit (d) shown in the following formula (d). This portion is herein referred to as a "VC unit".

In the CPVC used in the present invention, the amount of a sequence of four or more VC units in the molecular structure is preferably 30.0 mol % or less. As used herein, the "sequence of four or more VC units" means a portion consisting of four or more VC units joined in series.

[Chem. 2]

A VC unit present in the CPVC is a starting point of dehydrochlorination, and the presence of continuous VC units tends to cause a continuous dehydrochlorination reaction called the "zipper reaction". That is, the greater is the number of a sequence of four or more VC units, the more readily dehydrochlorination will occur, which reduces thermal stability in the CPVC. Therefore, the proportion of a sequence of four or more VC units is preferably 30.0 mol % or less, more preferably 28.0 mol % or less. When the chlorine content of the CPVC is 69% by mass or more and less than 72% by mass, the proportion of a sequence of four or more VC units is preferably 18.0 mol % or less, more preferably 16.0 mol % or less.

The amount of a sequence of four or more vinyl chloride units in the molecular structure described above can be measured by molecular structure analysis using NMR described above.

The CPVC preferably has a chlorine content of 63 to 72% by mass.

A chlorine content of 63% by mass or more leads to sufficient heat resistance of the molded product. A chlorine content of 72% by mass or less leads to improved moldability.

The chlorine content is more preferably 66% by mass or more, and more preferably 69% by mass or less.

The chlorine content of the CPVC can be measured in accordance with the method described in JIS K 7229.

The CPVC may have any degree of polymerization. The degree of polymerization is preferably 500 to 800.

When the degree of polymerization is within the range, both the fluidity in injection and the strength of the molded product can be achieved.

The CPVC preferably has a UV absorbance at a wavelength of 216 nm of 8.0 or less, more preferably 0.8 or less.

In an ultraviolet absorption spectrum, a wavelength of 216 nm is the wavelength at which —CH=CH—C(=O)— and —CH=CH—CH=CH—, which are heterogeneous structures in the CPVC, show absorption.

From the value of the UV absorbance of the CPVC, the heterogeneous structures in the molecular chain during the chlorination reaction can be quantified and thus used as an index of thermal stability. In the molecular structure of the CPVC, a chlorine atom attached to carbon adjacent to double-bonded carbon is unstable. Thus, dehydrochlorination occurs from this chlorine atom as the starting point. That is, the greater is the value of UV absorbance at the wavelength of 216 nm, the more readily dehydrochlorination will occur, which results in reduced thermal stability.

In particular, when the chlorine content of the CPVC is 63% by mass or more and less than 69% by mass, the value of the UV absorbance is preferably 0.8 or less. When the value of the UV absorbance exceeds 0.8, the influence of the heterogeneous structures in the molecular chain will be significant, which may result in low thermal stability.

When the chlorine content of the CPVC is 69% by mass or more and 72% by mass or less, the value of the UV absorbance is preferably 8.0 or less. When the value of the UV absorbance exceeds 8.0, the influence of the heterogeneous structures in the molecular chain will be significant, leading to low thermal stability.

In the CPVC, time required for the amount of dehydrochlorination at 190° C. to reach 7,000 ppm is preferably 60 seconds or longer, more preferably 100 seconds or longer.

The CPVC undergoes pyrolysis at high temperatures, and produces HCl gas during pyrolysis. Generally, as the degree of chlorination of the CPVC increases, the number of VC units decreases, and thus, the amount of dehydrochlorination tends to decrease. As the degree of chlorination increases, however, a nonuniform chlorinated state or the amount of the heterogeneous structures increases, which reduces thermal stability. Thus, an increase in the nonuniform chlorinated state or the amount of the heterogeneous structures can be analyzed by measuring the amount of dehydrochlorination. For example, the time required for the amount of dehydrochlorination at 190° C. to reach 7,000 ppm can be used as an index of thermal stability. The shorter is the time, the lower will be the thermal stability.

In particular, when the chlorine content of the CPVC is 63% by mass or more and less than 69% by mass, the time required for the amount of dehydrochlorination at 190° C. to reach 7,000 ppm is preferably 60 seconds or longer. When the time is shorter than 60 seconds, thermal stability will be greatly impaired. Thus, the time is preferably 60 seconds or longer, more preferably 70 seconds or longer, still more preferably 80 seconds or longer.

When the chlorine content of the CPVC is 69% by mass or more and 72% by mass or less, the time is preferably 100 seconds or longer. When the time is shorter than 100 seconds, thermal stability will be significantly low. The time is therefore preferably 100 seconds or longer, more preferably 120 seconds or longer, still more preferably 140 seconds or longer.

The time required for the amount of dehydrochlorination at 190° C. to reach 7,000 ppm can be measured as follows. Initially, 1 g of the chlorinated polyvinyl chloride is placed in a test tube and heated at 190° C. in an oil bath. The produced HCl gas is then collected. The collected HCl gas is dissolved in 100 mL of ion-exchange water, and the pH is measured. The HCl concentration (ppm) (that is, the number of grams of HCl produced per million grams of the chlorinated polyvinyl chloride) is calculated based on the pH value. The time required for the HCl concentration to reach 7,000 ppm is then measured.

The resin composition for injection molding of the present invention contains a polyvinyl chloride (hereinafter also referred to as a "PVC").

The use of the polyvinyl chloride and the chlorinated polyvinyl chloride in combination can impart sufficient thermal stability when a calcium alkyl carboxylate and a zinc compound are used as thermal stabilizers, and thus allows the resin composition to be suitably used even in injection molding.

In the present invention, the polyvinyl chloride is a polymer that mainly contains the structural unit (d) represented by above formula (d). Specifically, the proportion of the structural unit (d) in the polyvinyl chloride is preferably 51 to 100 mol %.

As the PVC, a vinyl chloride homopolymer, a copolymer of a vinyl chloride monomer and a monomer with unsaturated bond(s) that is copolymerizable with the vinyl chloride monomer, a graft copolymer obtained by graft copolymerization of a vinyl chloride monomer with a polymer, and the like can be used. These polymers may be used singly or in combinations of two or more.

Examples of the monomer with unsaturated bond(s) that is copolymerizable with the vinyl chloride monomer include α-olefins, vinyl esters, vinyl ethers, (meth)acrylates, aromatic vinyls, vinyl halides, and N-substituted maleimides. These monomers may be used singly or in combinations of two or more.

Examples of the α-olefins include ethylene, propylene, and butylene. Examples of the vinyl esters include vinyl acetate and vinyl propionate. Examples of the vinyl ethers include butyl vinyl ether and cetyl vinyl ether.

Examples of the (meth)acrylates include methyl (meth) acrylate, ethyl (meth)acrylate, butyl acrylate, and phenyl methacrylate. Examples of the aromatic vinyls include styrene and α-methyl styrene.

Examples of the vinyl halides include vinylidene chloride and vinylidene fluoride. Examples of the N-substituted maleimides include N-phenyl maleimide and N-cyclohexyl maleimide.

Preferred among them are ethylene and vinyl acetate.

The polymer to which vinyl chloride is graft copolymerized is not limited as long as vinyl chloride can be graft copolymerized. Examples of the polymer include ethylene-vinyl acetate copolymers, ethylene-vinyl acetate-carbon monoxide copolymers, ethylene-ethyl acrylate copolymers, ethylene-butyl acrylate-carbon monoxide copolymers, ethylene-methyl methacrylate copolymers, and ethylene-propylene copolymers. Examples of the polymer also include acrylonitrile-butadiene copolymers, polyurethane, chlorinated polyethylene, and chlorinated polypropylene. These polymers may be used singly or in combinations of two or more.

The method of polymerizing the PVC is not limited, and a conventionally known method such as aqueous suspension polymerization, block polymerization, solution polymerization, or emulsion polymerization can be used.

The PVC has a chlorine content of less than 56.8% by mass.

With the chlorine content within the range, the moldability is improved, and the molded product has high heat resistance. The chlorine content is preferably 36.8 to 56.7% by mass.

The chlorinated polyvinyl chloride and the polyvinyl chloride preferably have an average chlorine content of 65 to 68% by mass. With the average chlorine content within this range, the heat resistance and the moldability can be ensured.

The average chlorine content of the chlorinated polyvinyl chloride and the polyvinyl chloride is obtained by multiplying the chlorine content of the chlorinated polyvinyl chloride and the chlorine content of the polyvinyl chloride by, respectively, the content ratio of the chlorinated polyvinyl chloride and the content ratio of the polyvinyl chloride, and adding up the resulting products.

The PVC has a degree of polymerization of 400 to 1,000. With the degree of polymerization in the range, a product satisfying both the fluidity and the product strength can be obtained. The lower limit of the degree of polymerization of the PVC is preferably 500 and the upper limit thereof is preferably 800.

The chlorinated polyvinyl chloride and the polyvinyl chloride preferably have a difference in degree of polymerization of 500 or less. With the difference in decree of polymerization in the range, a product satisfying both the fluidity and the product strength can be obtained. The difference in degree of polymerization is more preferably 300 or less.

In the resin composition for injection molding of the present invention, the lower limit of the polyvinyl chloride content is preferably 1 part by mass and the upper limit is preferably 30 parts by mass relative to 100 parts by mass of the chlorinated polyvinyl chloride. When the polyvinyl chloride is added within this range, the thermal stability can be further improved, and good appearance of the molded body can be maintained.

The lower limit of the polyvinyl chloride content is more preferably 5 parts by mass and the upper limit thereof is more preferably 20 parts by mass.

The polyvinyl chloride content of the entire resin composition for injection molding of the present invention is preferably 2 to 18% by mass.

The thermal stabilizer in the present invention contains a calcium alkyl carboxylate and a zinc compound.

The thermal stabilizer contains no heavy metal, and thus, a heavy-metal free resin composition for molding can be obtained.

The thermal stabilizer contains a calcium alkyl carboxylate and a zinc compound.

When this thermal stabilizer is used, hydrochloric acid produced by the pyrolysis of the chlorinated polyvinyl chloride immediately reacts with the zinc compound to form zinc chloride. Further, the growth of polyenes produced by the elimination of hydrochloric acid from the chlorinated polyvinyl chloride is stopped through bonding with the calcium alkyl carboxylate. As a result, coloring is suppressed.

The produced zinc chloride, which has the property of accelerating the pyrolysis of the chlorinated polyvinyl chloride, reacts with the calcium alkyl carboxylate to produce calcium chloride and zinc alkyl carboxylate in the present invention. As a result, the thermal stabilizer has a significant synergistic effect in that it suppresses the pyrolysis-accelerating effect of zinc chloride, while utilizing the effect of the zinc compound of rapidly capturing hydrochloric acid.

Examples of the calcium alkyl carboxylate include calcium salts of pentanoic acid, hexanoic acid, heptanoic acid, octanoic acid, cyclohexylpropionic acid, nonanoic acid, decanoic acid, lauric acid, myristic acid, palmitic acid, stearic acid, 12-hydroxystearic acid, arachidic acid, behenic acid, lignoceric acid, and montanic acid.

Among the above, a calcium alkyl carboxylate with 8 to 28 carbon atoms is preferably used.

Examples of the zinc compound include inorganic zinc compounds and organozinc compounds.

Examples of the inorganic zinc compounds include compounds including a carbonate, a chloride, a sulfate, an oxide, a hydroxide, a basic oxide, and a mixed oxide of zinc.

Examples of the organozinc compounds include alkyl zinc compounds such as di- and/or mono-alkyl zinc, zinc salts of organic aliphatic carboxylic acids, zinc salts of unsubstituted or substituted organic aromatic carboxylic acids, zinc organic phosphites, zinc salts of substituted or unsubstituted phenols, zinc salts of amino acids and derivatives thereof, and zinc salts of organic mercaptans.

Examples of organic aliphatic carboxylic acids forming the zinc salts of organic aliphatic carboxylic acids include montanic acid, rice bran fatty acids, behenic acid, erucic acid, stearic acid, oleic acid, linolic acid, rice fatty acids, ricinoleic acid, myristic acid, palmitic acid, lauric acid, lower fatty acids, octylic acid, isostearic acid, dimer acids, naphthenic acid, and acetic acid. Examples of the organic aliphatic carboxylic acids also include azelaic acid and monoesters thereof, sebacic acid and monoesters thereof, adipic acid and monoesters thereof, succinic acid and monoesters thereof, malonic acid and monoesters thereof, maleic acid and monoesters thereof, and crotonic acid and monoesters thereof. Examples of the organic aliphatic carboxylic acids also include malic acid and monoesters thereof, tartaric acid and monoesters thereof, citric acid and monoesters or diesters thereof, lactic acid, glycolic acid, thiodipropionic acid and monoesters thereof.

Examples of unsubstituted or substituted aromatic carboxylic acids forming the zinc salts of unsubstituted or substituted organic aromatic carboxylic acids include benzoic acid, o-, m- and p-toluylic acid, p-tert-butyl benzoic acid, p-hydroxybenzoic acid, salicylic acid, polybasic acids such as phthalic acid, meta-phthalic acid, terephthalic acid, and trimellitic acid, as well as monoesters or diesters thereof.

Examples of organic phosphites forming the zinc organic phosphites include acid phosphites, which are reaction products of fatty alcohols and phosphorus pentoxide. Specific examples of acid phosphites include butyl acid phosphite, octyl acid phosphite, stearyl acid phosphite, and behenyl acid phosphite.

Examples of substituted or unsubstituted phenols forming the zinc salts of substituted or unsubstituted phenols include phenols, cresols, xylol, octylphenol, nonylphenol, dinonylphenol, cyclohexylphenol, and phenylphenol. Examples of the substituted or unsubstituted phenols also include bisphenol A, bisphenol S, bisphenol F, esters of p-hydroxybenzoic acid, and esters of salicylic acid.

Examples of the amino acids and derivatives thereof include baked glutamic acid, glycine, and alanine.

Examples of organic mercaptans forming the zinc salts of organic mercaptans include lauryl mercaptan, thioglycolic acid and esters thereof, mercaptopropionic acid and esters thereof, thiomalic acid and monoesters or diesters thereof.

The thermal stabilizer, which contains a calcium alkyl carboxylate and a zinc compound, is preferably a mixture of the calcium alkyl carboxylate and the zinc compound.

The thermal stabilizer may be in the form of a powder or granular material, for example. The thermal stabilizer made into such a form can be used as a single-pack thermal stabilizer.

When the thermal stabilizer is in the form of a particulate material, the particle size can be adjusted as appropriate, depending on the purpose. Generally, the average particle size is preferably 50 μm to 5 mm, particularly preferably 70 μm to 2 mm.

The thermal stabilizer in the form of the granular material can be produced using a known granulation method, for example, extrusion granulation, spray granulation, rotating disk granulation, rolling granulation, or compression granulation.

The thermal stabilizer preferably has a loss in quantity on heating at 230° C. of less than 5% by mass.

When the loss in quantity on heating at 230° C. is 5% by mass or more, bubbles may be included inside the molded product to result in poor strength, or a streak-like pattern may be formed near the surface of the molded product to result in a defective appearance.

The loss in quantity on heating at 230° C. is more preferably less than 3% by mass.

The lower limit thereof is not limited, but is preferably 0.1% by mass.

The loss in quantity on heating at 230° C. can be measured using a thermogravimetric measurement (TG) apparatus.

The thermal stabilizer contains a calcium alkyl carboxylate and a zinc compound. The mixing ratio of the calcium alkyl carboxylate to the zinc compound (calcium alkyl carboxylate:zinc compound) is preferably 9:1 to 4:6, more preferably 8:2 to 5:5.

The resin composition for injection molding of the present invention preferably has a thermal stabilizer content of 0.4 to 20 parts by mass, more preferably 1 to 10 parts by mass relative to 100 parts by mass of the chlorinated polyvinyl chloride. When the thermal stabilizer is contained within this range, the thermal stability can be more improved, and good appearance of the molded body can be maintained.

According to the present invention, since the above thermal stabilizer is used, a heavy metal-free resin composition for injection molding can be obtained. As used herein, the term "heavy metal" refers to a metal with a high density, and generally, a metal with a density of 4 to 5 g/cm$^3$ or more. The term "heavy metal-free" means that the heavy metal content is 1,000 ppm or less. The heavy metal content is preferably 100 ppm or less.

Examples of such heavy metals include transition metals other than scandium, for example, Mn, Ni, Fe, Cr, Co, Cu, and Au. Such heavy metals also include metals of p-block elements in period 4 or less (e.g., Sn, Pb, and Bi), Cd, and Hg.

The resin composition for injection molding of the present invention preferably further contains an antioxidant.

Examples of the antioxidant include phenolic antioxidants, phosphate antioxidants, sulfur antioxidants, and amine antioxidants. These antioxidants may be used singly or in combinations of two or more. Among the above, a phenolic antioxidant is preferred, and in particular, a hindered phenolic antioxidant is preferred.

Examples of the hindered phenolic antioxidant include 2,6-di-t-butyl-p-cresol, 2,6-diphenyl-4-octadecyloxyphenol, stearyl (3,5-t-butyl-4-hydroxyphenyl)propionate, distearyl (3,5-t-butyl-4-hydroxybenzyl)phosphonate, 2,2'-methylenebis(4-methyl-6-t-butylphenol), 2,2'-methylenebis(4-ethyl-6-t-butylphenol), bis[3,3-bis(4-hydroxy-3-t-butylphenyl)butyric acid]glycol ester, 4,4'-butylidenebis(6-t-butyl-m-cresol), 2,2'-ethylidenebis(4,6-di-t-butylphenol), 2,2'-ethylidenebis(4-sec-butyl-6-t-butylphenol), 1,1,3-tris(2-methyl-4-hydroxy-5-t-butylphenyl)butane, bis[2-t-butyl-4-methyl-6-(2-hydroxy-3-t-butyl-5-methylbenzyl)phenyl] terephthalate, 1,3,5-tris (2,6-dimethyl-3-hydroxy-4-t-butylbenzyl) isocyanurate, 1,3,5-tris(3,5-di-t-butyl-4-hydroxybenzyl) isocyanurate, 1,3,5-tris(3,5-di-t-butyl-4-hydroxybenzyl)-2,4,6-trimethylbenzene, 1,3,5-tris[(3,5-di-t-butyl-4-hydroxyphenyl)propionyloxyethyl] isocyanurate, pentaerythrityl-tetrakis[methylene-3-(3,5-di-t-butyl-4-hydroxyphenyl)propionate], 2-t-butyl-4-methyl-6-(2'-acryloyloxy-3'-t-butyl-5'-methylbenzyl)phenol, 3,9-bis(1',1'-dimethyl-2'-hydroxyethyl)-2,4,8,10-tetraoxaspiro[5,5]undecane, and bis[β-(3-t-butyl-4-hydroxy-5-methylphenyl)propionate]. Among the above, 1,3,5-tris(3,5-di-t-butyl-4-hydroxybenzyl) isocyanurate, pentaerythrityl-tetrakis[methylene-3-(3,5-di-t-butyl-4-hydroxyphenyl)propionate], and the like are preferred. These hindered phenolic antioxidants can be used singly or in combinations of two or more.

The antioxidant preferably has a loss in quantity on heating at 200° C. of less than 5% by mass.

When the loss in quantity on heating at 200° C. is 5% by mass or more, bubbles may be included inside the molded product to result in poor strength, or a streak-like pattern may be formed near the surface of the molded product to result in a defective appearance.

The loss in quantity on heating at 200° C. is more preferably less than 3% by mass.

The resin composition for injection molding of the present invention preferably has an antioxidant content of 0.1 to 3 parts by mass, more preferably 0.2 to 2.5 parts by mass, relative to 100 parts by mass of the chlorinated polyvinyl chloride. When the antioxidant is contained within this range, a molded product with little coloration due to yellowing can be obtained.

The resin composition for injection molding of the present invention preferably further contains an auxiliary stabilizer. When the auxiliary stabilizer is contained, thermal stability can be further improved.

A heavy metal-free auxiliary stabilizer can be used as the auxiliary stabilizer. Examples thereof include organic acid salts, epoxy compounds such as epoxidized soybean oil, epoxidized linseed oil, epoxidized tetrahydrophthalate, and epoxidized polybutadiene, organophosphorous compounds, phosphites, phosphates, and metal hydroxides such as calcium hydroxide and sodium hydroxide. Examples of the auxiliary stabilizer also include sodium adipate, bisphenol A-type epoxy compounds, glycidyl (meth)acrylate copolymers, oxetanyl compounds, vinyl ether compounds, and zeolite compounds. These auxiliary stabilizers may be used singly or in combinations of two or more. Note that the auxiliary stabilizer differs from the calcium alkyl carboxylate and the zinc compound.

Further, the auxiliary stabilizer preferably has a loss in quantity on heating at 200° C. of less than 5% by mass.

The resin composition for injection molding of the present invention may be optionally mixed with additives such as lubricants, processing aids, impact resistance modifiers, heat resistance improvers, ultraviolet absorbents, light stabilizers, fillers, thermoplastic elastomers, and pigments.

Examples of the lubricants include internal lubricants and external lubricants. An internal lubricant is used to reduce the fluid viscosity of the molten resin during molding to prevent the generation of frictional heat. Examples of the internal lubricants include, but are not limited to, butyl stearate, lauryl alcohol, stearyl alcohol, glycerol monostearate, stearic acid, and bisamide. These internal lubricants may be used singly or in combinations of two or more.

The lubricant preferably has a loss in quantity on heating at 200° C. of less than 5% by mass.

The external lubricant is used to improve the slip effect between metal surfaces and the molten resin during molding. Examples of the external lubricants include, but are not limited to, paraffin wax, polyolefin waxes such as polyethylene lubricants, ester waxes such as fatty acid ester lubricants, and montanic acid wax. These external lubricants may be used singly or in combinations of two or more.

Examples of the processing aids include, but are not limited to, acrylic processing aids such as alkyl acrylate-alkyl methacrylate copolymers having a mass average molecular weight of 100,000 to 2,000,000. Examples of the acrylic processing aids include, but are not limited to, n-butyl acrylate-methyl methacrylate copolymers and 2-ethylhexyl acrylate-methyl methacrylate-butyl methacrylate copolymers. These may be used singly or in combination of two or more.

The processing aid preferably has a loss in quantity on heating at 200° C. of less than 5% by mass.

Examples of the impact resistance modifiers include, but are not limited to, methyl methacrylate-butadiene-styrene copolymers (MBS), chlorinated polyethylene, and acrylic rubbers.

Examples of the heat resistance improvers include, but are not limited to, α-methylstyrene resins and N-phenyl maleimide resins.

Examples of the light stabilizers include, but are not limited to, hindered amine light stabilizers.

Examples of the ultraviolet absorbents include, but are not limited to, salicylate ultraviolet absorbents, benzophenone ultraviolet absorbents, benzotriazole ultraviolet absorbents, and cyanoacrylate ultraviolet absorbents.

Examples of the pigments include, but are not limited to, organic pigments such as azo pigments, phthalocyanine pigments, threne pigments, and dye lake pigments; and inorganic pigments such as titanium dioxide and other oxide pigments, sulfide/selenide pigments, and ferrocyanide pigments.

A plasticizer may be added to the resin composition for injection molding of the present invention to improve processability during molding. The use of a large amount of plasticizer, however, is not so desirable because it may reduce the thermal stability of the molded body. Examples of the plasticizers include, but are not limited to, dibutyl phthalate, di-2-ethylhexyl phthalate, and di-2-ethylhexyl adipate.

A thermoplastic elastomer may be added to the resin composition for injection molding of the present invention to improve workability. Examples of the thermoplastic elastomers include, but are not limited to, copolymers such as acrylonitrile-butadiene copolymers (NBR), ethylene-vinyl acetate copolymers (EVA), and ethylene-vinyl acetate-carbon monoxide copolymers (EVACO). Examples of the thermoplastic elastomers also include vinyl chloride thermoplastic elastomers, styrene thermoplastic elastomers, olefin thermoplastic elastomers, urethane thermoplastic elastomers, polyester thermoplastic elastomers, and polyamide thermoplastic elastomers. Examples of the vinyl chloride thermoplastic elastomers include vinyl chloride-vinyl acetate copolymers and vinyl chloride-vinylidene chloride copolymers.

These thermoplastic elastomers may be used singly or in combinations of two or more.

The resin composition for injection molding of the present invention is preferably free from a β-diketone. A β-diketone is a component contained in conventional thermal stabilizers to improve thermal stability. When, however, a thermal stabilizer containing a β-diketone is used, the appearance of a molded body tends to be impaired in the production of the molded body by molding a resin composition by extrusion molding or injection molding. For example, streaks of a yellow to reddish brown color with a thickness of approximately 0.1 to 1 mm may be formed on the surface of the molded body, in parallel with the direction of flow of the resin. A molded body having such an impaired appearance is a defective product. In particular, the use of a die that has been used for long hours tends to produce such a defective product. In accordance with the present invention, however, a resin composition for injection molding having excellent thermal stability can be provided without using a thermal stabilizer containing a β-diketone.

The thermal stabilizer preferably has a loss in quantity on heating at 230° C. of less than 2.0% by mass.

When the loss in quantity on heating at 230° C. is 2.0% by mass or more, bubbles may be included inside the molded product to result in poor strength, or a streak-like pattern may be formed near the surface of the molded product to result in a defective appearance.

The loss in quantity on heating at 230° C. is more preferably less than 1.0% by mass.

The lower limit thereof is not limited, but is preferably 0.1% by mass.

The loss in quantity on heating at 230° C. can be measured using a thermogravimetric measurement (TG) apparatus.

The resin composition for injection molding of the present invention maybe produced by, for example, a method including the steps of preparing a chlorinated polyvinyl chloride and mixing the chlorinated polyvinyl chloride with a polyvinyl chloride and a thermal stabilizer. The step of preparing the chlorinated polyvinyl chloride may include suspending a polyvinyl chloride in an aqueous medium in a reaction container to prepare a suspension, introducing chlorine into the reaction container, and chlorinating the polyvinyl chloride by any conventionally known method.

In the chlorination step, part of the chlorinated polyvinyl chloride may be chlorinated so that the chlorinated polyvinyl chloride and the polyvinyl chloride can coexist.

In the step of preparing the chlorinated polyvinyl chloride, the reaction vessel used may be a commonly used vessel such as a glass-lined stainless steel reaction vessel or titanium reaction vessel, for example.

The method of preparing the suspension of the polyvinyl chloride in an aqueous medium is not limited. For example, a cake-like PVC obtained by subjecting a polymerized PVC to monomer removal treatment may be used, a dried PVC may be resuspended in an aqueous medium, or a suspension obtained by removing any substances undesired for the chlorination reaction from the polymerization system may be used. In particular, it is preferred to use a cake-like resin obtained by subjecting a polymerized PVC to monomer removal treatment.

The aqueous medium used may be ion-exchange-treated pure water, for example. While the amount of the aqueous medium is not limited, generally, it is preferably 150 to 400 parts by mass based on 100 parts by mass of the PVC.

Chlorine to be introduced into the reaction vessel may be either liquid chlorine or gaseous chlorine. The use of liquid chlorine is efficient in that a large amount of chlorine can be charged into the reaction vessel in a short period of time. Chlorine may be added in the course of reaction to adjust the pressure or supply chlorine. At, this time, gaseous chlorine in addition to liquid chlorine may be blown into the reaction vessel, as required. It is preferred to use chlorine after purging 5 to 10% by mass of chlorine from a cylinder.

While the gauge pressure in the reaction vessel is not limited, it is preferably from 0.3 to 2 MPa, because the higher is the chlorine pressure, the more readily the chlorine will penetrate into the PVC particles.

The method of chlorinating the PVC in the suspended state is not limited. Examples of chlorination methods include a method in which the excitation of bonding of the PVC and chlorine is brought about by thermal energy to accelerate the chlorination (hereinafter referred to as heat chlorination); and a method in which light energy such as ultraviolet light is applied to accelerate the chlorination by photoreaction (hereinafter referred to as photo-chlorination). The heating method in the chlorination by thermal energy is not limited, and for example, heating with an external jacket from the reactor walls is effective. The use of light energy such as ultraviolet light requires an apparatus capable of light energy irradiation such as ultraviolet irradiation under high temperature and high pressure conditions. In the case of photo-chlorination, the chlorination reaction temperature is preferably 40° C. to 80° C.

Preferred among the above chlorination methods is a heat chlorination method involving no ultraviolet irradiation. Preferred is a method in which the excitation of bonding of the polyvinyl chloride and chlorine is brought about by heat alone or by heat and hydrogen peroxide to accelerate the chlorination reaction.

In the case of the chlorination reaction by light energy, the amount of light energy needed to chlorinate the PVC is greatly affected by the distance between the PVC and the light source. Thus, the amount of received energy is different inside and on the surface of the PVC particles, so that chlorination does not occur uniformly. As a result, a CPVC with reduced uniformity is obtained. In contrast, with the method of chlorination by heat without ultraviolet irradiation, a more uniform chlorination reaction occurs to produce a CPVC with increased uniformity.

The chlorination by heat alone is preferably performed at a temperature of 70° C. to 140° C. When the temperature is excessively low, the rate of chlorination will decrease. When the temperature is excessively high, dehydrochlorination reaction will occur along with the chlorination reaction, which causes coloration of the resulting CPVC. The heating temperature is more preferably 100° C. to 135° C. The heating method is not limited, and heating may be performed with an external jacket from the reaction vessel walls, for example.

In the chlorination, hydrogen peroxide is preferably further added to the suspension. The addition of hydrogen peroxide can improve the rate of chlorination. Hydrogen peroxide is preferably added in an amount of 5 to 500 ppm to the PVC per hour of the reaction time. When the amount of hydrogen peroxide added is excessively small, the effect of improving the rate of chlorination cannot be obtained. When the amount of hydrogen peroxide added is excessively large, the thermal stability of the CPVC will decrease.

When hydrogen peroxide is added as described above, the rate of chlorination is improved, so that the heating temperature can be set relatively low. The heating temperature may be 65° C. to 110° C., for example.

During the chlorination, it is preferred to perform chlorination at a chlorine consumption rate of 0.010 to 0.015 kg/PVC-Kg·5 min after the chlorine content reaches a value that is five percentage points by mass lower than the final chlorine content, and further perform chlorination at a chlorine consumption rate of 0.005 to 0.010 kg/PVC-Kg·5 min after the chlorine content reaches a value that is three percentage points by mass lower than the final chlorine content. As used herein, the term "chlorine consumption rate" refers to the amount of chlorine consumed in 5 minutes per kilogram of the raw material PVC.

When chlorination is performed using the above-described method, a CPVC having less nonuniformity in the chlorinated state and having excellent thermal stability can be obtained.

The method of producing the resin composition for injection molding of the present invention includes the subsequent step of adding a polyvinyl chloride, a thermal stabilizer, and optionally an antioxidant to the chlorinated polyvinyl chloride, followed by mixing.

The method of mixing the thermal stabilizer and the antioxidant is not limited, and may be a method using hot blending or cold blending, for example.

In accordance with the structure of the present invention described above, a resin composition for injection molding having excellent thermal stability and free of heavy metals such as lead, cadmium, and tin can be provided.

Further, in accordance with another aspect of the present invention, a molded body molded from the resin composition for injection molding of the present invention is provided. Such a molded body is also encompassed by the present invention.

The injection molding method may be any conventionally known molding method, for example, a common injection molding method, a foam injection molding method, a supercritical foam injection molding method, an ultra-high-speed injection molding method, an injection compression molding method, a gas-assisted injection molding, a sandwich molding method, a sandwich foam molding method, or an insert/outsert molding method.

The molded body of the present invention is heavy metal-free, as with the resin composition for injection molding of the present invention, and thus, has the advantage of having no adverse effects on the environment, has excellent thermal stability, and has a satisfactory appearance. The molded body of the present invention can therefore be suitably used in applications such as building components, pipes and engineering plastics, and housing materials.

Advantageous Effects of Invention

The present invention can provide a resin composition for injection molding that can provide a molded body having excellent thermal stability, excellent thermal fluidity, and high water pressure resistance without a heavy metal such as lead or tin. The present invention also relates to a molded body including the resin composition for injection molding.

The use of the present invention can greatly improve the meltability in injection molding, leading to excellent process characteristics. The use of the present invention further can prevent defects of the resulting molded product such as scorching or silver streaks. In addition, the use of the present invention can reduce the occurrence of weld lines and thus prevent defective appearance and a reduction in strength due to stress concentration.

Description of Embodiments

The present invention will be hereinafter described in more detail with reference to examples; however, the invention should not be construed as being limited to these examples.

EXAMPLE 1

(Preparation of Chlorinated Polyvinyl Chloride)

A glass-lined reaction vessel with an internal volume of 300 L was charged with 200 kg of ion-exchange water and 56 kg of a polyvinyl chloride with an average degree of polymerization of 700. The mixture was stirred, and water was further added to the reaction vessel to disperse the mixture in the water. The pressure was subsequently reduced to remove oxygen from the reaction vessel, and the temperature was simultaneously elevated to 90° C.

Chlorine was then supplied into the reaction vessel so that the chlorine partial pressure would be 0.4 MPa, and the chlorination reaction was performed while adding 0.2% by mass hydrogen peroxide at a rate of 1 part by mass per hour (320 ppm/hour). The reaction was continued until the chlorine content of the chlorinated polyvinyl chloride reached 67.3% by mass. When the chlorine content of the chlorinated polyvinyl chloride reached 62.3% by mass (five percentage points by mass lower than the final chlorine content), the amount of 0.2% by mass hydrogen peroxide added was reduced to 0.1 parts by mass per hour (200 ppm/hour), and the average chlorine consumption rate was adjusted to 0.012 kg/PVC-kg·5 min, and then the chlorination was allowed to proceed. Further, when the chlorine content reached 65.3% by mass (three percentage points by mass lower than the final chlorine content), the amount of 0.2% by mass hydrogen peroxide added was reduced to 150 ppm/hour, and the average chlorine consumption rate was adjusted to 0.008 kg/PVC-kg·5 min, and then the chlorination was allowed to proceed. In this way, a chlorinated polyvinyl chloride having a chlorine content of 67.3% by mass was obtained. The chlorine content was measured in accordance with JIS K 7229.

(Preparation of Resin Composition for Injection Molding)

To 100 parts by mass of the obtained chlorinated polyvinyl chloride (degree of polymerization: 700) were added 7 parts by mass of a polyvinyl chloride (chlorine content: 56.7% by mass, degree of polymerization: 700), 4 parts by mass of a thermal stabilizer, and 0.5 parts by mass of an antioxidant, followed by mixing. The thermal stabilizer used contained 2.0 parts by mass of calcium stearate and 2.0 parts by mass of zinc stearate. The antioxidant used was pentaerythrityl-tetrakis[3-(3,5-di-t-butyl-4-hydroxyphenyl)propionate] (hindered phenolic antioxidant, Irganox 1010, available from BASF, loss in quantity on heating at 200° C.: 1.0% by mass).

Furthermore, 5.0 parts by mass of an impact resistance modifier, 2.0 parts by mass of a polyethylene lubricant (available from Mitsui Chemicals, Inc., Hiwax 220 MP), 0.3 parts by mass of a fatty acid ester lubricant (available from Emery Oleochemicals Japan Ltd., LOXIOL G-32), and 5.0 parts by mass of titanium dioxide (available from Ishihara Sangyo Kaisha, Ltd., TIPAQUE CR-90) were added. The impact resistance modifier used was MBS (methacrylic butadiene styrene) resin (available from Kaneka Corporation, Kane Ace M-511). They were then uniformly mixed in a super mixer to give a resin composition for injection molding.

(Preparation of Injection Molded Body)

The obtained resin composition for injection molding was fed into a twin-screw counter-rotating conical extruder with a diameter of 30 mm (Osada Seisakusho; "OSC-30") to prepare pellets at a resin temperature of 190° C.

The obtained pellets were fed into an injection molding machine (available from Nippon Steel Nisshin Co., Ltd. "J100E-C5") to prepare a socket-shaped injection molded body having a nominal diameter of 25 mm. The resin temperature when the resin was purged from the nozzle was 230° C.

EXAMPLE 2

A resin composition for injection molding and an injection molded body were prepared as in Example 1 except that the amount of the polyvinyl chloride added was changed to 3 parts by mass.

EXAMPLE 3

A resin composition for injection molding and an injection molded body were prepared as in Example 1 except that the amount of the polyvinyl chloride added was changed to 25 parts by mass.

EXAMPLE 4

A chlorinated polyvinyl chloride, a resin composition for injection, molding, and an injection molded body were prepared as in Example 1 except that the polyvinyl chloride was changed to a polyvinyl chloride (chlorine content: 56.7% by mass, degree of polymerization: 1,000).

EXAMPLE 5

A resin composition for injection molding and an injection molded body were produced as in Example 1 except that the amount of the polyvinyl chloride added was changed to 18 parts by mass.

EXAMPLE 6

A resin composition for injection molding and an injection molded body were prepared as in Example 1 except that the chlorinated polyvinyl chloride was changed to a chlorinated polyvinyl chloride (chlorine content: 67.3% by mass, degree of polymerization: 600).

EXAMPLE 7

A resin composition for injection molding and an injection molded body were prepared as in Example 1 except that the chlorinated polyvinyl chloride was changed to a chlorinated polyvinyl chloride (chlorine content: 67.3% by mass, degree of polymerization: 500).

EXAMPLE 8

A chlorinated polyvinyl chloride, a resin composition for injection molding, and an injection molded body were prepared as in Example 1 except that the polyvinyl chloride was changed to a polyvinyl chloride (chlorine content: 56.7% by mass, degree of polymerization: 500).

COMPARATIVE EXAMPLE 1

A resin composition for injection molding and an injection molded body were prepared as in Example 1 except that the polyvinyl chloride was not added, and that the thermal stabilizer was changed to 2.0 parts by mass calcium montanate and 2.0 parts by mass of zinc laurate.

COMPARATIVE EXAMPLE 2

A resin composition for injection molding and an injection molded body were produced as in Example 1 except that the amount of the polyvinyl chloride added was changed to 35 parts by mass.

COMPARATIVE EXAMPLE 3

A resin composition for injection molding and an injection molded body were prepared as in Example 1 except that the type of the polyvinyl chloride was changed to a polyvinyl chloride (chlorine content: 56.7% by mass, degree of polymerization: 1,300) and the amount thereof was changed to 7 parts by mass, and that other components added were changed to those shown in Table 1.

COMPARATIVE EXAMPLE 4

A resin composition for injection molding and an injection molded body were prepared as in Example 1 except that the amount of the polyvinyl chloride added was changed to 0.5 parts by mass, and that other components added were changed to those shown in Table 1.

<Evaluation>

The resin compositions for injection molding and molded bodies obtained in the examples and the comparative examples were evaluated as follows. Table 1 shows the results.

[Evaluation of Resin Composition for Injection Molding]

<Static Thermal Stability>

The obtained chlorinated polyvinyl chloride composition was fed to two 8-inch rolls and kneaded at 205° C. for three minutes to prepare a 1.0-mm-thick sheet. The obtained sheet was heated in a gear oven at 200° C. The time (minutes) before the sheet foamed or became blackened was measured.

<Ease of Gelling and Time to Reach Decomposition Temperature>

The obtained chlorinated polyvinyl chloride composition was fed into a plastomill (available from Toyo Seiki Seisaku-Sho, Ltd., "Labo PlastoMill") and kneaded at a rotation rate of 50 rpm, 195° C., and a loading of 63 g to measure the gelling time (seconds). The gelling time was the time from the start of kneading until the kneading torque reached its peak. After the gelling, kneading and heating were continued to measure the decomposition time (minutes) of the chlorinated polyvinyl chloride. The time from the start of kneading until the resin temperature, which became stable after the gelling, started to rise again was taken as the time to reach decomposition temperature.

<Mechanical Physical Properties (Tensile Strength and Thermal Deformation Temperature)>

The obtained chlorinated polyvinyl chloride composition was fed to two 8-inch rolls, kneaded at 205° C. for 3 minutes, and formed into 1.0-mm-thick sheets. The obtained sheets were layered, pre-heated with a press at 205° C. for 3 minutes, and pressurized for 4 minutes to prepare a 3-mm-thick press plate. The obtained press plate was cut into specimens by machining. With these specimens, the tensile strength and the tensile modulus of elasticity were measured in accordance with ASTM D638, and the thermal deformation temperature was measured in accordance with ASTM D648 at a load of 186 N/cm$^2$. The thermal deformation temperature was measured after annealing the obtained press plate in a gear oven at 90° C. for 24 hours.

<Flow Evaluation>

Flow evaluation was performed using Shimadzu Flowtester (CFT-500D/100D, available from SHIMADZU Corp.). Specifically, the roll sheet prepared in <Mechanical physical properties (tensile strength and thermal deformation temperature)> was cut into about 5 mm square pieces. The pieces were fed into the barrel heated to 210° C. and extruded through a capillary having a die diameter of 1 mm and a die length of 10 mm at a load of 205 kgf. Then, the measurement was started when 3 mm of the molten resin was extruded from the capillary, and the time (seconds) taken per millimeter of extrusion was measured.

A measured value of 0.2 mm/sec or more was evaluated as "Passed". A measured value of less than 0.2 mm/sec was evaluated as "Failed".

[Evaluation of Molded Body]

<Appearance Observation>

The socket-shaped injection molded body was evaluated for the presence or absence of bubbles (foaming), the presence or absence of silver streaks, and the presence or absence of scorching (discoloration).

The depth of a weld of the obtained socket-shaped injection molded body was measured with One-Shot 3D Measuring Macroscope (available from Keyence Corporation, VR-3000).

<Water Pressure Resistance Test>

The Water pressure resistance was evaluated as "Passed" or "Failed" by a method in accordance with "Test for resistance to hydraulic pressure" in ASTM D1599.

TABLE 1

| | | | Examples | | | | | |
|---|---|---|---|---|---|---|---|---|
| | | | 1 | 2 | 3 | 4 | 5 | 6 |
| Composition (parts by mass) | Chlorinated polyvinyl chloride (degree of polymerization 500) | | — | — | — | — | — | — |
| | Chlorinated polyvinyl chloride (degree of polymerization 600) | | — | — | — | — | — | 100 |
| | Chlorinated polyvinyl chloride (degree of polymerization 700) | | 100 | 100 | 100 | 100 | 100 | — |
| | Polyvinyl chloride (degree of polymerization 500) | | — | — | — | — | — | — |
| | Polyvinyl chloride (degree of polymerization 700) | | 7 | 3 | 25 | — | 18 | 7 |
| | Polyvinyl chloride (degree of polymerization 1000) | | — | — | — | 7 | — | — |
| | Polyvinyl chloride (degree of polymerization 1300) | | — | — | — | — | — | — |
| | Calcium stearate | | 2.0 | 2.0 | 2.0 | 2.0 | 2.0 | 2.0 |
| | Calcium montanate | | — | — | — | — | — | — |
| | Zinc stearate | | 2.0 | 2.0 | 2.0 | 2.0 | 2.0 | 2.0 |
| | Zinc laurate | | — | — | — | — | — | — |
| | Hindered phenolic antioxidant | | 0.5 | 0.5 | 0.5 | 0.5 | 0.5 | 0.5 |
| | Methacrylic butadiene styrene resin | | 5.0 | 5.0 | 5.0 | 5.0 | 5.0 | 5.0 |
| | Polyethylene lubricant | | 2.0 | 2.0 | 2.0 | 2.0 | 2.0 | 2.0 |
| | Fatty acid ester lubricant | | 0.3 | 0.3 | 0.3 | 0.3 | 0.3 | 0.3 |
| | Titanium dioxide | | 5.0 | 5.0 | 5.0 | 5.0 | 5.0 | 5.0 |
| Average chlorine content (% by mass) | | | 66.6 | 67.0 | 65.2 | 66.6 | 65.7 | 66.6 |
| Difference in degree of polymerization | | | 0 | 0 | 0 | 300 | 0 | 100 |
| Evaluation (chlorinated polyvinyl chloride composition) | Thermal stability | Static thermal stability (minutes) | 100 | 100 | 90 | 100 | 90 | 100 |
| | Process characteristics | Ease of gelling [time (seconds)] | 89 | 90 | 80 | 90 | 85 | 85 |
| | | Time to reach decomposition temperature [(minutes)] | 17 | 17 | 19 | 16 | 18 | 17 |
| | Mechanical properties | Tensile strength (Mpa) | 53.0 | 53.0 | 54.0 | 53.0 | 54.0 | 53.0 |
| | | Thermal deformaion temperature (° C.) | 108 | 108 | 101 | 108 | 105 | 108 |
| | Fluidity | Flow evaluation | Passed | Passed | Passed | Passed | Passed | Passed |
| Evaluation (molded product) | Molding quality | Foaming | Absent | Absent | Absent | Absent | Absent | Absent |
| | | Silver streak | Absent | Absent | Absent | Absent | Absent | Absent |
| | | Scorching | Absent | Absent | Absent | Absent | Absent | Absent |
| | | Weld depth [μm] | 10 | 15 | 4 | 18 | 8 | 4 |
| | Water pressure resistance evaluation | Water pressure resistance test | Passed | Passed | Passed | Passed | Passed | Passed |

| | | | Examples | | Comparative Examples | | | |
|---|---|---|---|---|---|---|---|---|
| | | | 7 | 8 | 1 | 2 | 3 | 4 |
| Composition (parts by mass) | Chlorinated polyvinyl chloride (degree of polymerization 500) | | 100 | — | — | — | — | — |
| | Chlorinated polyvinyl chloride (degree of polymerization 600) | | — | — | — | — | — | — |
| | Chlorinated polyvinyl chloride (degree of polymerization 700) | | — | 100 | 100 | 100 | 100 | 100 |

TABLE 1-continued

|  |  |  |  |  |  |  |  |  |
|---|---|---|---|---|---|---|---|---|
| Polyvinyl chloride (degree of polymerization 500) |  |  |  | — | 7 | — | — | — | — |
| Polyvinyl chloride (degree of polymerization 700) |  |  |  | 7 | — | — | 35 | — | 0.5 |
| Polyvinyl chloride (degree of polymerization 1000) |  |  |  | — | — | — | — | — | — |
| Polyvinyl chloride (degree of polymerization 1300) |  |  |  | — | — | — | — | 7 | — |
| Calcium stearate |  |  |  | 2.0 | 2.0 | — | 2.0 | 3.0 | 2.0 |
| Calcium montanate |  |  |  | — | — | 2.0 | — | — | — |
| Zinc stearate |  |  |  | 2.0 | 2.0 | — | 2.0 | 3.0 | 2.0 |
| Zinc laurate |  |  |  | — | — | 2.0 | — | — | — |
| Hindered phenolic antioxidant |  |  |  | 0.5 | 0.5 | 0.5 | 0.5 | 0.5 | 0.5 |
| Methacrylic butadiene styrene resin |  |  |  | 5.0 | 5.0 | 5.0 | 5.0 | 5.0 | 5.0 |
| Polyethylene lubricant |  |  |  | 2.0 | 2.0 | 2.0 | 2.0 | 2.0 | 2.0 |
| Fatty acid ester lubricant |  |  |  | 0.3 | 0.3 | 0.3 | 0.3 | 0.3 | 0.3 |
| Titanium dioxide |  |  |  | 5.0 | 5.0 | 5.0 | 5.0 | 5.0 | 5.0 |
| Average chlorine content (% by mass) |  |  |  | 66.6 | 66.6 | 67.3 | 64.6 | 66.6 | 67.2 |
| Difference in degree of polymerization |  |  |  | 200 | 300 | — | 0 | 600 | 0 |
| Evaluation (chlorinated polyvinyl chloride composition) | Thermal stability | Static thermal stability (minutes) | | 100 | 90 | 100 | 90 | 90 | 90 |
| | Process characteristics | Ease of gelling [time (seconds)] | | 80 | 75 | 95 | 80 | 92 | 92 |
| | | Time to reach decomposition temperature [(minutes)] | | 17 | 16 | 15 | 20 | 15 | 15 |
| | Mechanical properties | Tensile strength (Mpa) | | 53.0 | 52.0 | 53.0 | 56.0 | 53.0 | 53.5 |
| | | Thermal deformaion temperature (° C.) | | 108 | 108 | 108 | 90 | 108 | 108 |
| | Fluidity | Flow evaluation | | Passed | Passed | Failed | Passed | Failed | Failed |
| Evaluation (molded product) | Molding quality | Foaming | | Absent | Absent | Absent | Absent | Absent | Present |
| | | Silver streak | | Absent | Absent | Present | Absent | Present | Present |
| | | Scorching | | Absent | Absent | Present | Absent | Present | Present |
| | | Weld depth [μm] | | 5 | 4 | 22 | 2 | 30 | 20 |
| | Water pressure resistance evaluation | Water pressure resistance test | | Passed | Passed | Passed | Passed | Failed | Failed |

INDUSTRIAL APPLICABILITY

The present invention can provide a resin composition for injection molding that can provide a molded body having excellent thermal stability, excellent thermal fluidity, and high water pressure resistance without a heavy metal such as lead or tin. The present invention can also provide a molded body including the resin composition for injection molding.

The invention claimed is:

1. A resin composition for injection molding comprising:
   a chlorinated polyvinyl chloride;
   a polyvinyl chloride; and
   a thermal stabilizer,
   the thermal stabilizer comprising a calcium alkyl carboxylate and a zinc compound,
   the polyvinyl chloride having a degree of polymerization of 400 to 800,
   the resin composition comprising the polyvinyl chloride in an amount of 1 to 30 parts by mass relative to 100 parts by mass of the chlorinated polyvinyl chloride,
   wherein the chlorinated polyvinyl chloride and the polyvinyl chloride have an average chlorine content of 65 to 68% by mass, and
   the chlorinated polyvinyl chloride and the polyvinyl chloride have a difference in degree of polymerization of 200 or less.

2. The resin composition for injection molding according to claim 1,
   wherein the chlorinated polyvinyl chloride has structural units (a) to (c) represented by the following formulae (a) to (c):

[Chem. 1]

$$—CCl_2— \quad (a),$$

$$—CHCl— \quad (b),$$

$$—CH_2— \quad (c),$$

the proportion of the structural unit (a) is 17.5 mol % or less, the proportion of the structural unit (b) is 46.0 mol % or more, and the proportion of the structural unit (c) is 37.0 mol % or less, relative to the total number of moles of the structural units (a), (b), and (c).

3. The resin composition for injection molding according to claim 1,
   wherein the chlorinated polyvinyl chloride has a degree of polymerization of 500 to 800.

4. The resin composition for injection molding according to claim 1,
   wherein the chlorinated polyvinyl chloride has a chlorine content of 63 to 72% by mass.

5. The resin composition for injection molding according to claim 1,
   comprising the thermal stabilizer in an amount of 0.4 to 20 parts by mass relative to 100 parts by mass of the chlorinated polyvinyl chloride.

6. The resin composition for injection molding according to claim 1, further comprising an antioxidant.

7. The resin composition for injection molding according to claim 1,
   which is free from β-diketone.

8. A molded body molded from the resin composition for injection molding according to claim 1.

9. The resin composition for injection molding according to claim 1,
   wherein the polyvinyl chloride has a degree of polymerization of 400 to 700.

* * * * *